(12) United States Patent
Kuo et al.

(10) Patent No.: US 10,495,897 B2
(45) Date of Patent: Dec. 3, 2019

(54) LENS DRIVING MECHANISM HAVING LEAF SPRING

(71) Applicant: TDK TAIWAN CORP., Yangmei Taoyuan (TW)

(72) Inventors: Chen-Chi Kuo, Yangmei Taoyuan (TW); Chao-Chang Hu, Yangmei Taoyuan (TW); Sin-Jhong Song, Yangmei Taoyuan (TW)

(73) Assignee: TDK TAIWAN CORP., Yangmei Toayuan (TW)

( * ) Notice: Subject to any disclaimer, the term of this patent is extended or adjusted under 35 U.S.C. 154(b) by 133 days.

(21) Appl. No.: 15/800,439

(22) Filed: Nov. 1, 2017

(65) Prior Publication Data

US 2018/0136482 A1    May 17, 2018

Related U.S. Application Data

(60) Provisional application No. 62/421,576, filed on Nov. 14, 2016.

(30) Foreign Application Priority Data

Sep. 18, 2017   (CN) .......................... 2017 1 0841120

(51) Int. Cl.
  *G02B 27/64*  (2006.01)
  *G02B 7/08*   (2006.01)

(52) U.S. Cl.
  CPC ............. *G02B 27/646* (2013.01); *G02B 7/08* (2013.01)

(58) Field of Classification Search
  CPC .. G02B 27/64; G02B 27/646; H04N 5/23248; H04N 5/23264; H04N 5/2328; H04N 5/23287
  USPC ....... 359/554, 557; 250/201.1, 201.2, 201.4; 348/208.99, 208.2, 208.12; 396/52, 55
  See application file for complete search history.

(56) References Cited

U.S. PATENT DOCUMENTS

| 2018/0113322 | A1* | 4/2018 | Sugawara | G03B 5/00 |
| 2018/0120532 | A1* | 5/2018 | Murakami | G02B 7/04 |
| 2018/0136433 | A1* | 5/2018 | Kuo | G02B 7/04 |
| 2018/0136435 | A1* | 5/2018 | Kuo | G02B 7/09 |
| 2018/0239164 | A1* | 8/2018 | Park | G02B 7/09 |

* cited by examiner

*Primary Examiner* — Arnel C Lavarias
(74) *Attorney, Agent, or Firm* — Muncy, Geissler, Olds & Lowe, P.C.

(57) ABSTRACT

A lens driving mechanism is provided, including a bottom plate, a housing, a movable portion, and a biasing assembly. The housing is connected to and disposed on the bottom plate. The movable portion is disposed in the housing and movably connected to the bottom plate, wherein the biasing assembly is configured to force the movable portion to move relative to the bottom plate. The movable portion has a frame, a holder, and a first leaf spring. The holder is configured to hold an optical lens and is movably connected to the frame via the first leaf spring. The first leaf spring is disposed on a bottom surface of the frame, wherein the bottom surface of the frame faces the bottom plate.

21 Claims, 10 Drawing Sheets

LENS DRIVING MECHANISM HAVING LEAF SPRING

CROSS REFERENCE TO RELATED APPLICATIONS

This application claims the benefit of U.S. Provisional Application No. 62/421,576, filed on Nov. 14, 2016, and China Patent Application No. 201710841120.8 filed on Sep. 18, 2017, the entirety of which is incorporated by reference herein.

BACKGROUND OF THE INVENTION

Field of the Invention

The application relates in general to a lens driving mechanism, and in particular to a lens driving mechanism that includes a housing configured to restrict the movement of the holder and the optical lens disposed therein.

Description of the Related Art

Thanks to ongoing technological developments, the most recent electronic devices (such as tablet computers and smartphones) being put on the market are increasingly trending toward miniaturization, and they usually include a lens module capable of aiding in photography or recording video. The demands on these increasingly indispensable electronic devices are also rapidly growing. However, an image may come out blurry if the user shakes the lens module in the electronic device. To miniaturize the electronic device and improve image quality, it is increasingly important to design a smaller and effectively shockproof lens module.

BRIEF SUMMARY OF INVENTION

To address the deficiencies of conventional products, an embodiment of the invention provides a lens driving mechanism configured to drive an optical lens, including a bottom plate, a housing, a movable portion, and a biasing assembly. The housing is connected to and disposed on the bottom plate. The movable portion is disposed in the housing. The biasing assembly connects the bottom plate and the movable portion and is configured to force the movable portion to move relative to the bottom plate. The movable portion has a frame, a holder, and a first leaf spring. The holder is configured to sustain the optical lens and movably connects to the frame. The first leaf spring connects the frame and the holder, and the first leaf spring is disposed on a bottom surface of the frame which faces the bottom plate.

In some embodiments, the lens driving mechanism further comprises an elastic member connecting the bottom plate and the first leaf spring of the movable portion, and the first leaf spring is situated between the frame and the elastic member.

In some embodiments, the movable portion further includes an electromagnetic driving assembly configured to force the holder to move relative to the frame, and the electromagnetic driving assembly has a coil and a magnetic element respectively disposed on the holder and the frame, wherein the coil, the first leaf spring, and the elastic member are electrically connected to each other, and the first leaf spring is in direct contact with the elastic member.

In some embodiments, wherein when the holder moves to a lower-limit position relative to the housing, the holder is in contact with the elastic member.

In some embodiments, when the holder moves to the lower-limit position, the holder protrudes from the bottom surface of the frame.

In some embodiments, when the holder moves to an upper-limit position relative to the housing, the holder is in contact with the housing.

In some embodiments, in the direction of the optical axis of the optical lens, the frame is not overlapping with the holder.

In some embodiments, the movable portion further includes a second leaf spring disposed on a top surface of the frame and connecting the frame and the holder.

In some embodiments, in the direction which is perpendicular to the optical axis of the optical lens, the second leaf spring and the first leaf spring respectively have a second width and a first width, wherein the second width is larger than the first width.

In some embodiments, the movable portion further includes an electromagnetic driving assembly configured to force the holder to move relative to the frame, and the electromagnetic driving assembly has a coil and a magnetic element respectively disposed on the holder and the frame, wherein the second leaf spring has an outer string portion covering the frame and at least a portion of the magnetic element.

In some embodiments, in the direction of the optical axis of the optical lens, the frame, the first leaf spring, and the elastic member are overlapping.

In some embodiments, the first leaf spring connects the elastic member, the holder, and the frame, and viewed from the direction of the optical axis of the optical lens, the first leaf spring has a V-shaped structure.

In some embodiments, the frame has a first engaging portion, the elastic member has a second engaging portion, and the first and second engaging portions engage with each other.

In some embodiments, the frame includes a permeable material.

In some embodiments, the elastic member has an opening with a flange structure extending toward the holder.

In some embodiments, in a direction perpendicular to the optical axis of the optical lens, the flange structure of the elastic member and the holder are overlapping.

In some embodiments, the lens driving mechanism further comprises a plurality of protruding members disposed between the bottom plate and the elastic member, and a gap is formed between the bottom plate and the elastic member.

In some embodiments, the biasing assembly includes a shape-memory alloy (SMA) material.

In some embodiments, the biasing assembly forces the movable portion to move along the optical axis of the optical lens or forces the movable portion to rotate around the optical axis.

In some embodiments, the frame includes a board member and a plurality of sub-frames which are separated from each other, wherein the board member has a hollow structure and includes a permeable material, each sub-frame has a groove, and the board member is disposed in the grooves of the sub-frames.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The making and using of the embodiments of the lens driving mechanisms are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood to one of ordinary skill in the art to which this invention belongs. It should be appreciated that each term, which is defined in a commonly used dictionary, should be interpreted as having a meaning conforming to the relative skills and the background or the context of the present disclosure, and should not be interpreted by an idealized or overly formal manner unless defined otherwise.

Figure 1:
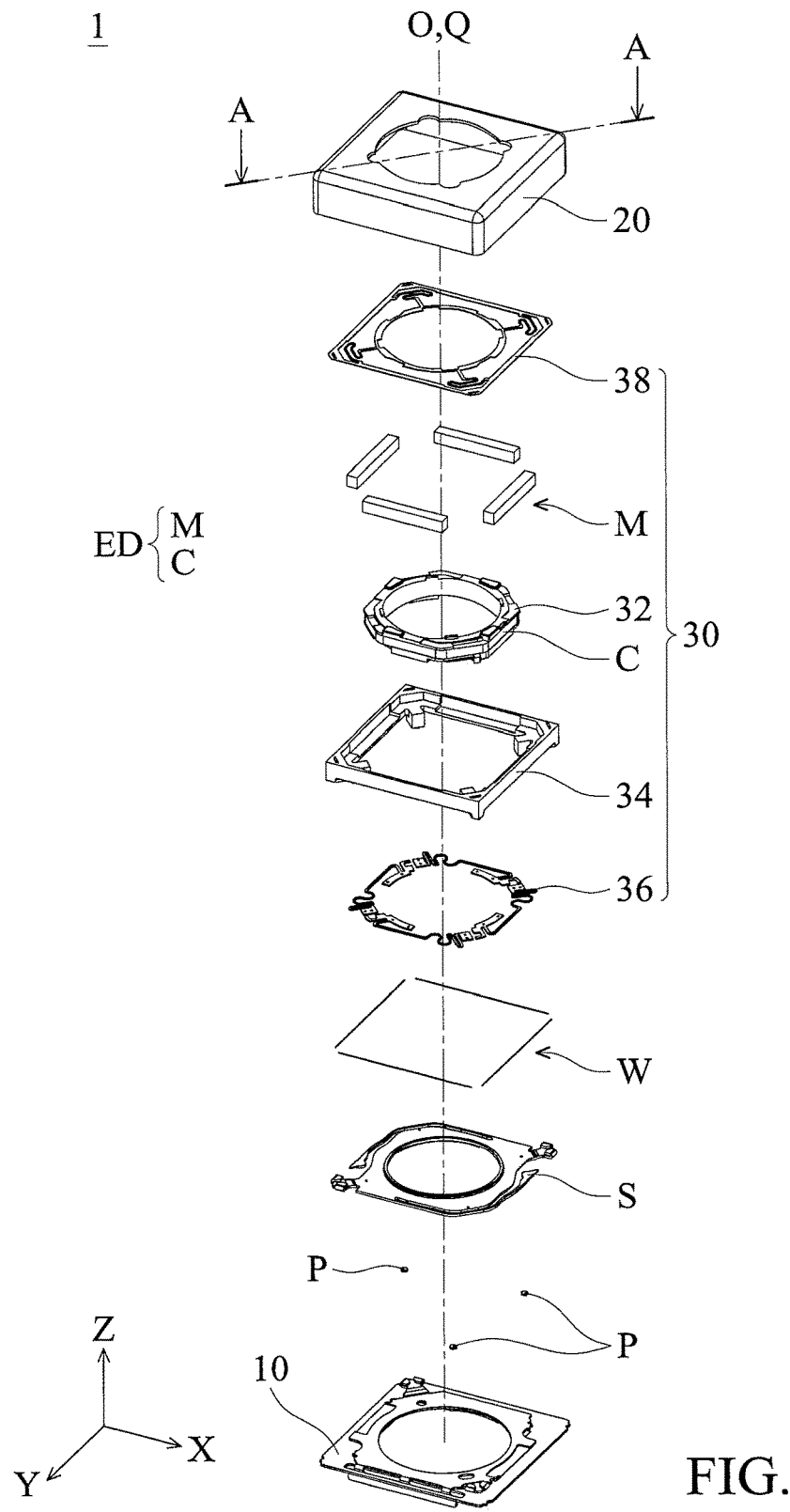
FIG. 1 is an exploded diagram of a lens driving mechanism according to an embodiment of the invention.

FIG. 1 is an exploded-view diagram of a lens driving mechanism 1 according to an embodiment of the invention. The lens driving mechanism 1 can be disposed in an electronic device, such as a camera, a tablet computer, or a cell phone, and it can sustain an optical lens (not shown) and force the optical lens to move relative to an image sensor disposed the electronic device, so that the lens driving mechanism 1 has the functions of auto-focusing (AF) and optical image stabilization (OIS), to enhance image quality.

Figure 2:
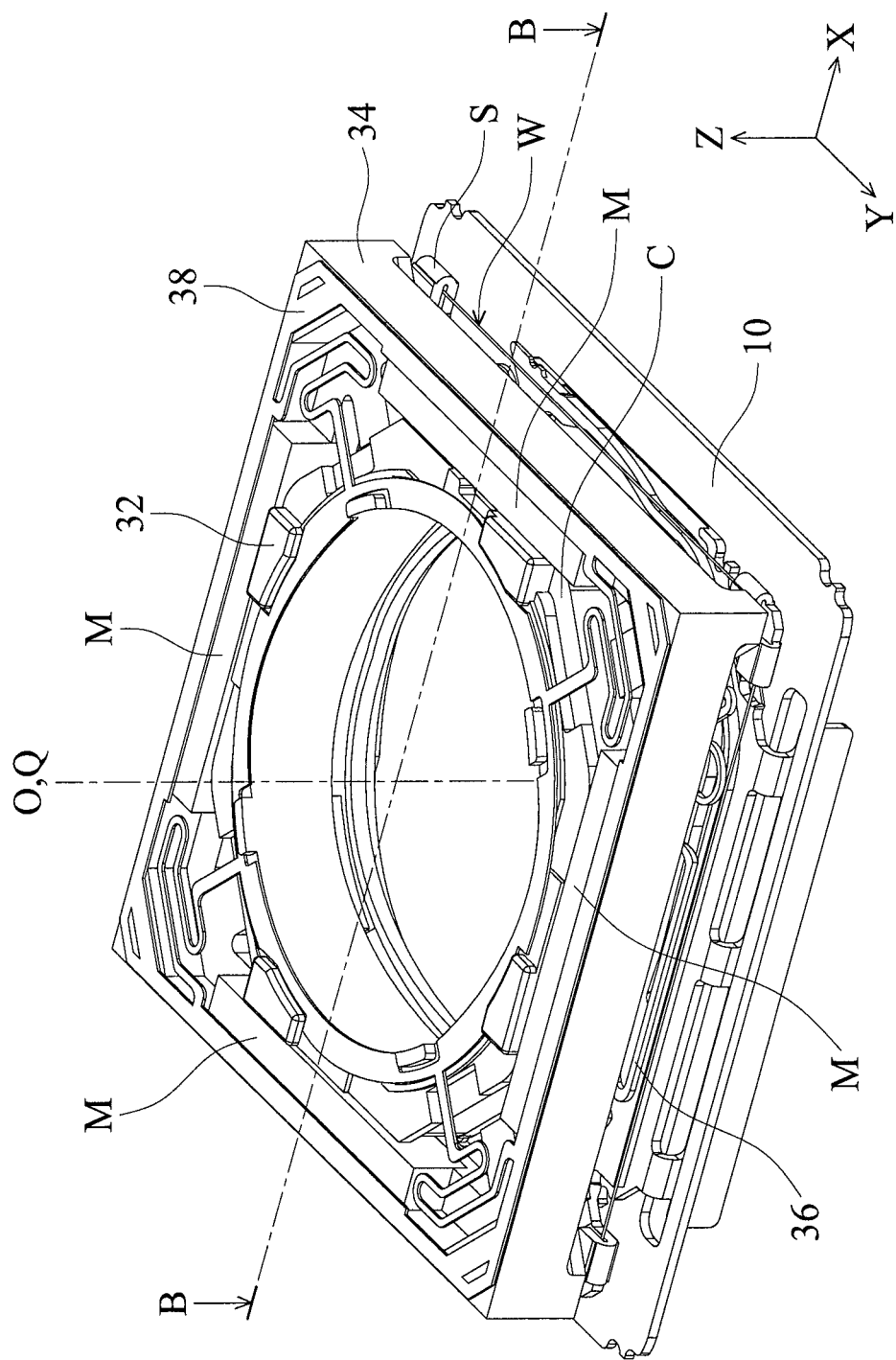
FIG. 2 is a schematic diagram of the lens driving mechanism in FIG. 1 after assembly (the housing 20 is omitted).

As shown in FIGS. 1 and 2, the lens driving mechanism 1 primarily comprises a bottom plate 10, a housing 20, a movable portion 30, a biasing assembly W, and an elastic member S. The housing 20 is connected to and disposed on the bottom plate 10. The movable portion 30, the biasing assembly W, and the elastic member S are disposed on the bottom plate 10 and situated in the housing 20 configured to protect them. The movable portion 30 can sustain an optical lens, wherein an image sensor is configured to receive light from the outside of the electronic device and through the optical lens so that an image is acquired. The detailed structure of the movable portion 30 is described below, and the connection between the movable portion 30 and the bottom plate 10 will be described later.

Figure 3:
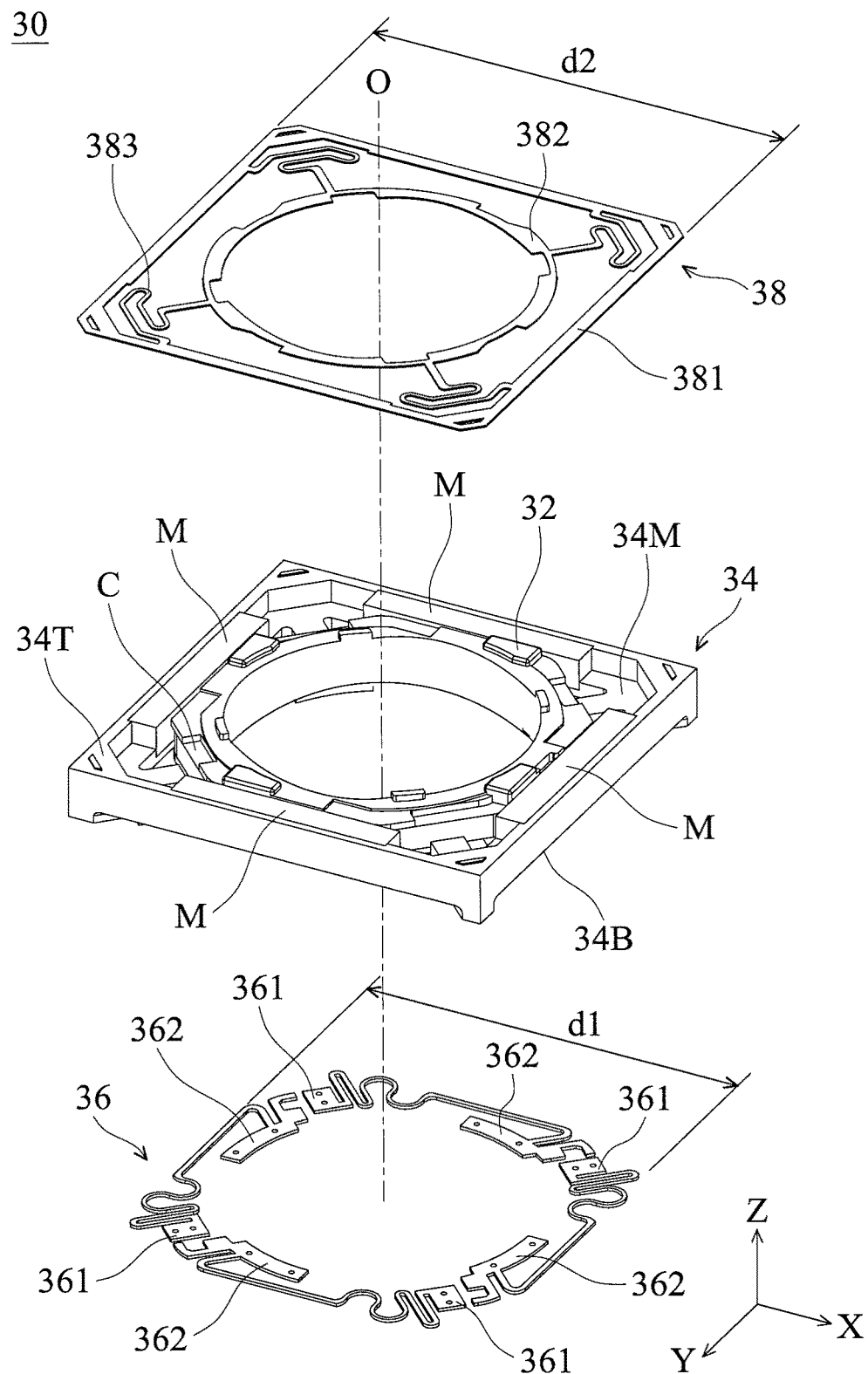
FIG. 3 is a schematic diagram of the movable portion 30 in FIG. 1.

Please refer to FIGS. 1 to 3, wherein FIG. 3 is a schematic diagram of the movable portion 30 in FIG. 1. The movable portion 30 includes a holder 32, a frame 34 (inner frame), an electromagnetic driving assembly ED, a first leaf spring 36, and a second leaf spring 38. The holder 32 is configured to hold an optical lens, and the frame 34 is disposed around the holder 32, wherein in the direction of the optical axis O of the optical lens, the frame 34 is not overlapping with the holder 32. The electromagnetic driving assembly ED includes a coil C and a plurality of magnetic elements M (such as magnets) which are respectively disposed on the holder 32 and the frame 34. More specifically, the coil C is disposed around the holder 32, and four magnetic elements M are disposed on the carrying surface 34M and correspond to the coil C. The connection of the magnetic elements M and the carrying surface 34M may be accomplished by applying a glue (for example, a transparent glue). Compared to a traditional connection mechanism which the frame does not has the carrying surface 34M so that the glue merely be applied on the lateral sidewall of the frame (for the adhesion of the magnetic elements to the frame), the carrying surface 34M of the frame 34 in the present embodiment has the effect of avoiding or preventing the glue flowing downwardly along the sidewall to the other components.

Figure 4:
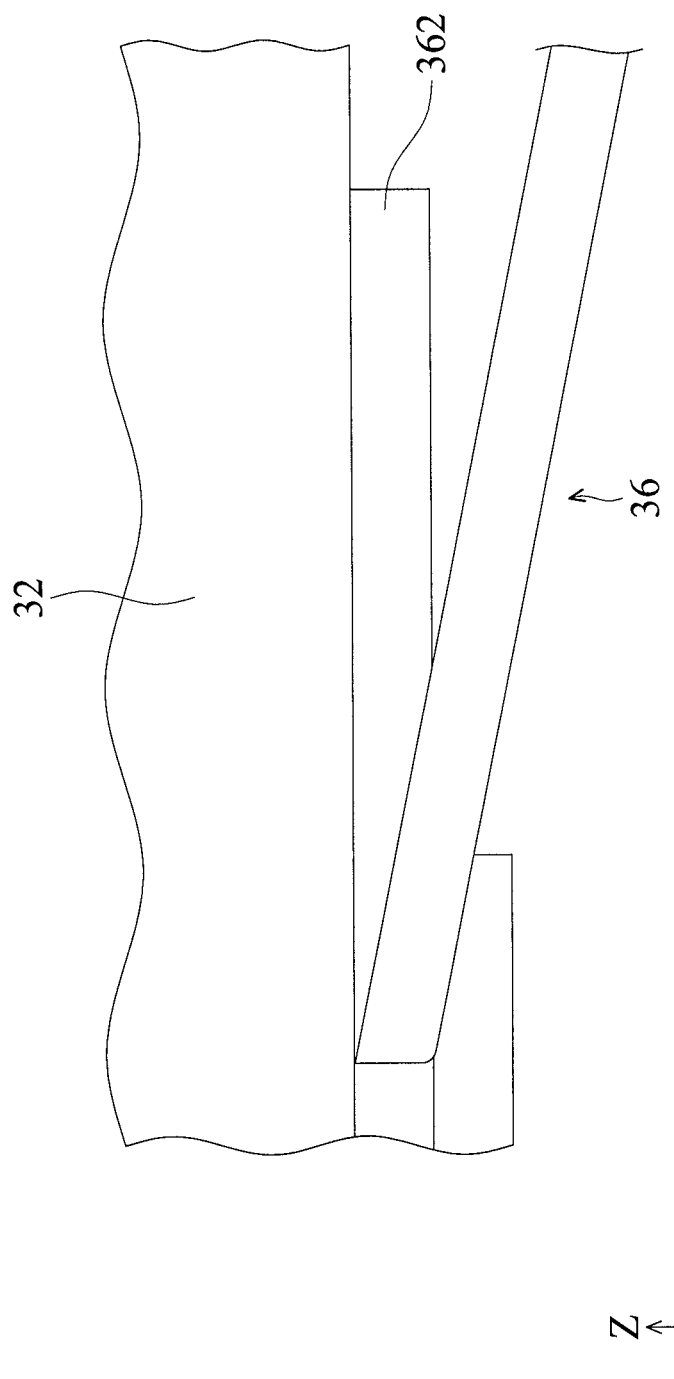
FIG. 4 is a schematic diagram of the second connecting area 362 of the first leaf spring connecting to the holder.

As shown in FIG. 3, the first and second leaf springs 36 and 38 are disposed on the two opposite sides of the frame 34 and connect the holder 32 to the frame 34, and the holder 32 is sandwiched therebetween. With respect to the details of the first leaf spring 36, it has a plurality of mutually independent portions (e.g., four), and each portion has a first connection area 361 and a second connection area 362 which respectively connect to the bottom surface 34B of the frame 34 and the holder 32. As shown in FIG. 4, when the first leaf spring 36 is connected to the holder 32, the second connection area 362 is in contact with the holder 32, and then a glue can be applied to them for adhesion (or by engaging). It should be noted that when viewed from a direction perpendicular to the optical axis O, the first leaf spring 36 has a V-shaped structure.

Referring to the second leaf spring 38, disposed on a top surface 34T of the frame 34, has a substantially rectangular-shaped string portion 381, a substantially circular-shaped inner string portion 382, and a plurality of bending portions 383 connected to the outer and inner string portions 381 and 382. As shown in FIGS. 2 and 3, the outer string portion 381 of the second leaf spring 38 partially covers the magnetic elements M and is connected to the frame 34, and the inner string portion 382 is connected to the holder 32. In addition, the second width d2 of the second leaf spring 38 is larger than the first width d1 of the first leaf spring 36 in the direction which is perpendicular to the optical axis O of the optical lens.

In the present embodiment, the coil C may receive one or more driving signals (such as electrical current) supplied by an external power source (not shown), so that a magnetic force or forces can be provided between the coil and the magnetic elements M so that the electromagnetic driving assembly ED can force the holder 32 and the optical lens disposed therein to move together with respect to the housing 20 (or frame 34) along the optical axis O (Z-axis), thereby achieving auto-focusing. Moreover, the aforementioned movement may be used to compensate for the shaking of the optical lens to achieve the purpose of an anti-shake function. Furthermore, before applying the driving signal, the holder 32 can be positioned at an initial position with respect to the frame 34 by the first and second leaf springs 36 and 38.

Figure 10:
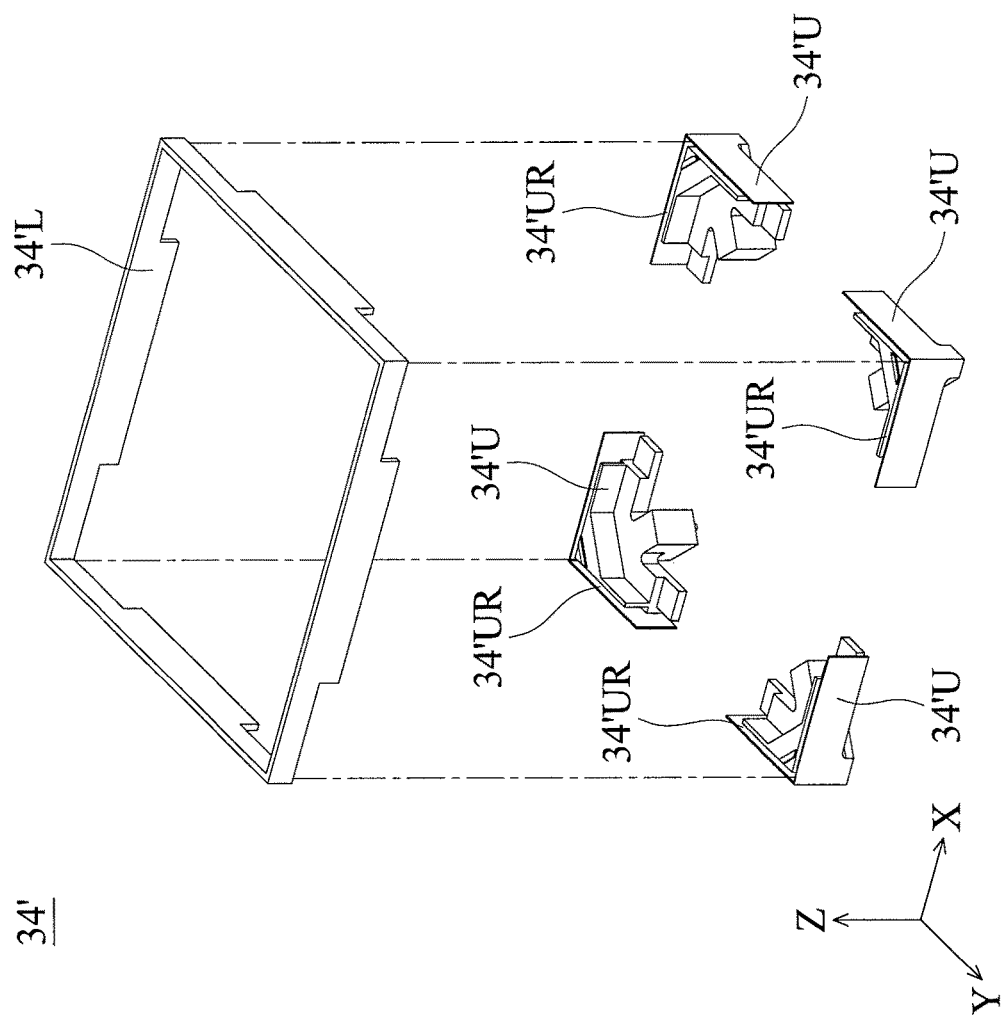
FIG. 10 is a schematic diagram of a frame 34' according to another embodiment of the invention.

Moreover, the frame 34, connected to the magnetic elements M, may have a permeable material, or a plurality of elements with permeable materials may be embedded in the sidewalls of the frame 34 which faces the magnetic elements M, which enhances the mechanical strength of the frame 34, and the magnetic force of the magnetic element M can be concentrated in a predetermined direction to enhance the magnetic force for forcing/driving the holder 32 to move. In addition, as shown in FIG. 10, another frame 34' is provided according to another embodiment of the invention. The frame 34' has a hollow structure and includes a substantially rectangular-shaped board member 34'L with a permeable material and a plurality of sub-frames 34'U which are separated each other. Each sub-frame 34'U has an L-shaped groove 34'UR, and the board member 34'L is disposed in those grooves 34'UR. The present embodiment also enhances the mechanical strength of the frame 34' and the magnetic force of the magnetic elements M can be concentrated in a predetermined direction.

Next, the connection of the movable portion 30 and the bottom plate 10 is described in detail below.

Please refer to FIG. 2, the bottom plate 10 has a central axis Q, wherein the optical axis O coincides with the central axis Q when the optical lens (disposed in the holder 32) is at the initial position. The bottom plate 10, for example, may be a flexible printed circuit board (FPCB), is disposed under the frame 34 of the movable portion 30, and the bottom surface 34B of the frame 34 faces the bottom plate 10. The elastic member S and the biasing assembly W are disposed between the bottom plate 10 and the movable portion 30. The bottom plate 10 and the movable portion 30 are connected each other via the biasing assembly W and the elastic member S.

Figure 5:
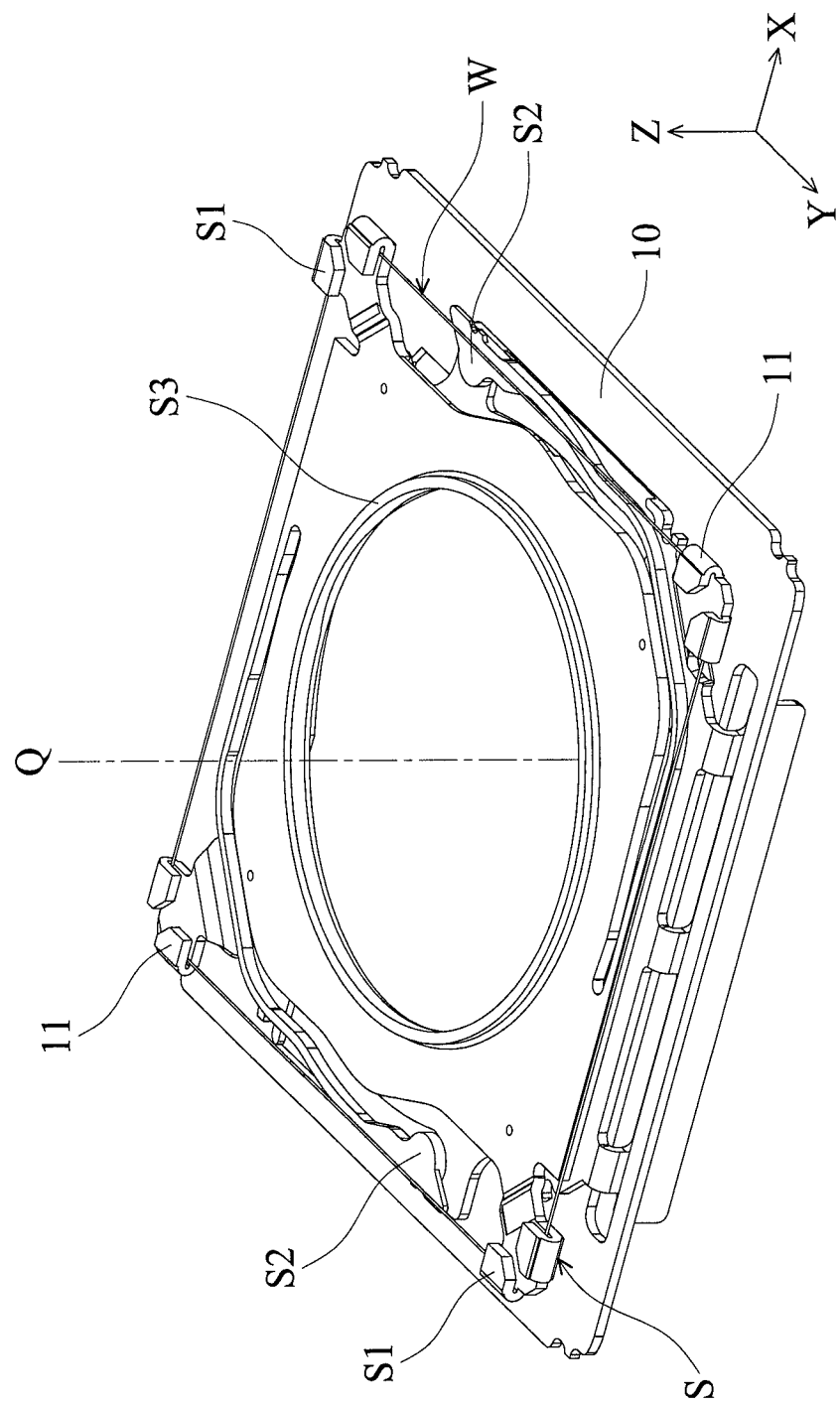
FIG. 5 is a schematic diagram of the connection of the bottom plate, the elastic member and the biasing assembly.
Figure 6:
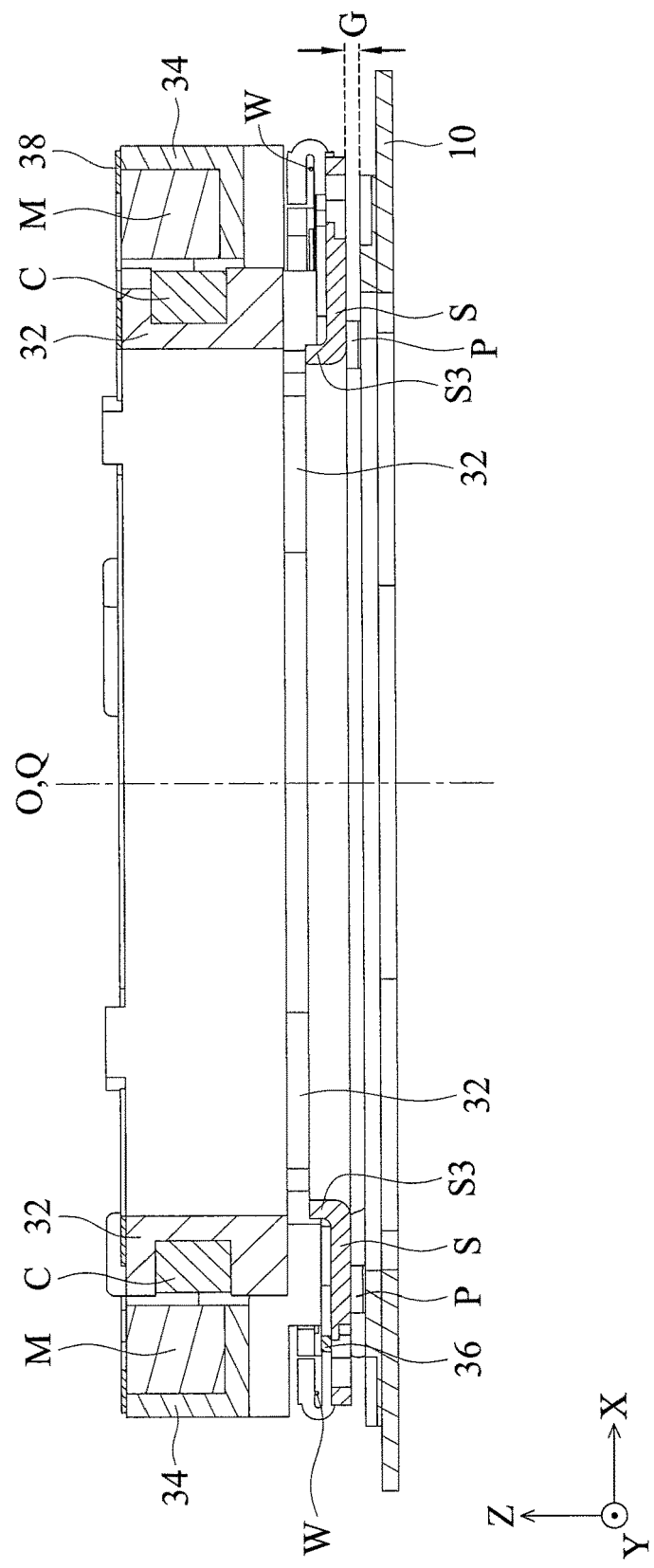
FIG. 6 is a sectional view diagram taken along line B-B in FIG. 2.

More specifically, as shown in FIGS. 5 and 6, the elastic member S (such as a sheet spring; disposed on the bottom plate 10) includes a metal material and a substantially rectangular structure, and has two L-shaped arms S2 which is bendable and extends toward the bottom plate 10 to connect the bottom plate 10. Furthermore, a plurality of protruding members P are disposed between the bottom plate 10 and the elastic member S (please refer to FIGS. 6 and 1), so that a gap G is formed between the bottom plate 10 and the elastic member S. Therefore, a sufficient space is provided for the elastic member S being deform (caused by the drive/force of the biasing assembly W; the details of the biasing assembly W will be described later). In the present embodiment, the bottom plate 10 is connected to the elastic member S (for example, three contact points) by using at least three separate protruding members P, so that the accuracy of interval distance (the gap G) between the bottom plate 10 and the elastic member S can be enhanced, to achieve better positioning results. In some embodiments, the protruding member P may have a metallic material and/or an elastic material.

As shown in FIG. 6, the elastic member S connects the bottom plate 10 and the first leaf spring 36 of the movable portion 30, and the first leaf spring 36 is located between the frame 34 and the elastic member S and is connected to the holder 32 (FIG. 4), and the frame 34, the first leaf spring 36, and the elastic member S overlap in the direction of the optical axis O of the optical lens. As a result, when a drive signal (e.g., current) is applied from the bottom plate 10 to the coil C on the carrier 32, the circuit path is in the following order (sequence): the bottom plate 10, the elastic member S, the first leaf spring 36 to the coil C on the holder 32. The elastic member S is electrically connected to the first leaf spring 36 directly, thereby simplifying the internal circuit of the integral optical driving mechanism 1. As the circuit has been simplified to reduce the number of circuit connections between the components, not only can the risk of damage to the circuit connection be avoided or reduced, but also the purpose of miniaturization can be achieved. In addition, the electrical resistance is decreased due to the simplified circuit, to achieve an energy-saving effect.

Please refer to FIG. 5, the biasing assembly W has four elongated biasing wires that correspond to the four sides of the bottom plate 10 having a substantially rectangular structure. The two ends of each biasing wire are respectively connected to the fixed portion 11 of the bottom plate 10 and the connecting portion S1 of the elastic member S, wherein the fixed portion 11 and the connecting portion S1 extend along the direction of optical lens O (Z-axis) and extend toward the movable portion 30.

The four biasing wires of the biasing assembly W are respectively disposed on the four sides of the bottom plate 10 and corresponding to the four sides of the frame 34 of the movable portion 30 (please see FIGS. 2 and 5). Each side of the bottom plate 10 (or frame 34) is provided with one fixed portion 11 and one connecting portion S1 which are connected via one biasing wire. Specifically, the two fixed portions 11 and the two connecting portions S1 are respectively disposed at the four corners of the bottom plate 10 and positioned in a staggered configuration (that is, any two adjacent corners are provided with one connecting portion S1 and one fixed portion 11). The bottom plate 10 and the movable portion 30 are connected through the biasing member W and the elastic member S.

The biasing assembly W having a plurality of biasing wires includes a shape-memory alloy (SMA) material, and the lengths of the biasing wires can be changed by applying driving signals (e.g., electrical current) to them from an external power source (not shown). For example, when applying one or more driving signals to heat the biasing assembly W, the biasing assembly W is able to deform (e.g., become elongated or shortened). When the application of the driving signals is stopped, the deformed biasing assembly W will recover to its original length. In other words, by applying one or more appropriate driving signals, the length of the biasing assembly W can be controlled to move the movable portion 30 (including the holder 32 and the optical lens) relative to the bottom plate 10, to alter the posture of the movable portion 30. Thus, the lens driving mechanism 1 has the function of optical-shaking compensation and optical-image stabilization.

The biasing assembly W, for example, may include a titanium-nickel (TiNi) alloy, a titanium-palladium (TiPd) alloy, a titanium-nickel-copper (TiNiCu) alloy, a titanium-nickel-palladium (TiNiPd) alloy, or a combination thereof.

Figure 7:
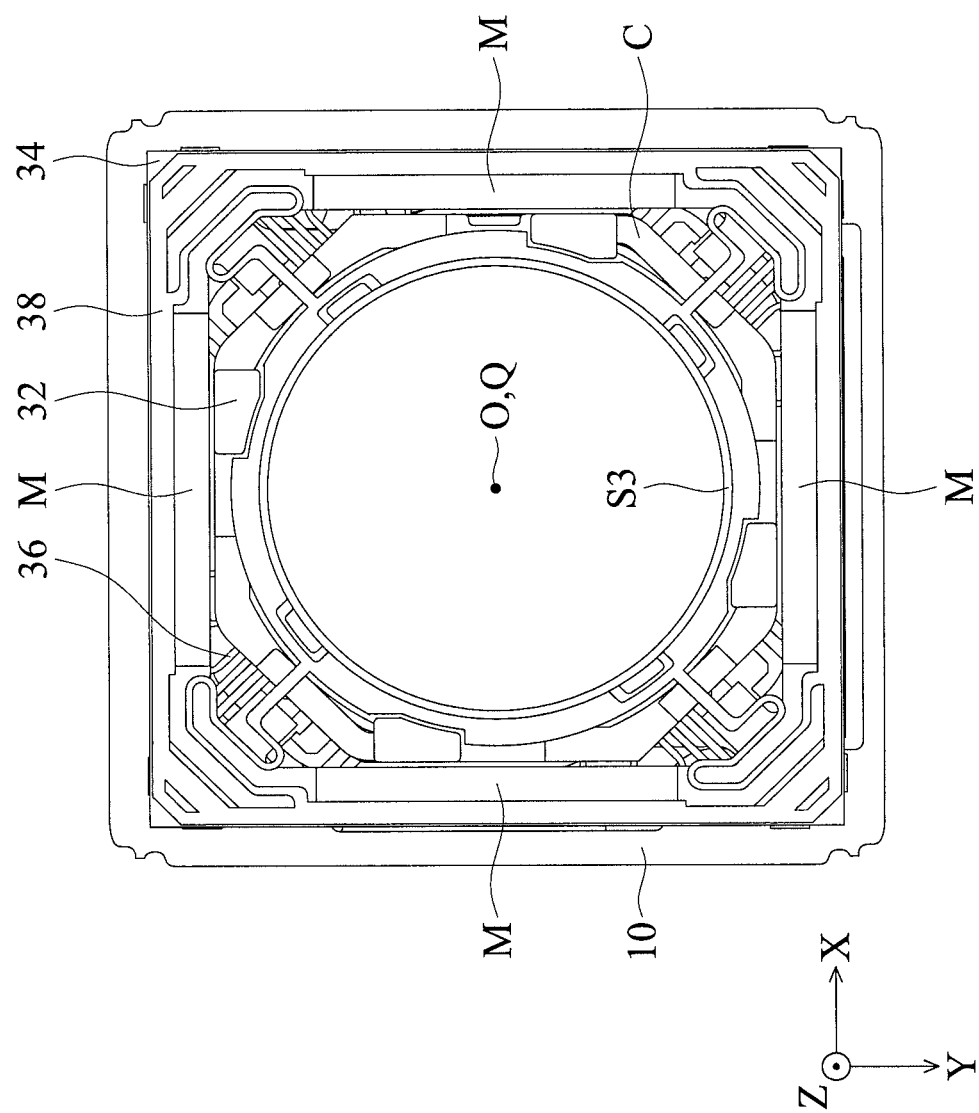
FIG. 7 is a top plan view diagram of the lens driving mechanism (the housing 20 is omitted) in FIG. 2.

In addition, as shown in FIGS. 5 to 7, the opening of the elastic member S is formed with a circular-shaped (or substantially circular-shaped) flange structure S3, extending along the central axis Q/optical axis O. The flange structure S3 is received in the holder 32 and overlaps with the holder 32 (the flange structure S3 and the holder 32 are overlapping) in a direction that is perpendicular to the optical axis O (FIG. 6). The flange structure S3 is closer to the central axis Q/optical axis O than the holder 32 (FIG. 7). By forming the flange structure S3, it is possible to avoid or reduce the amount of external particles that enter the holder 32 and affect the optical lens, thereby greatly improving the product.

It should be noted that the elastic member S may connect to conductive wires (not shown) which are formed on the bottom plate 10 by insert molding or 3D molded interconnect device (MID) technology. Thus, those conductive wires connect to the four biasing wires via the elastic member S to form four respective independent circuits, whereby driving signals (e.g., current) can be supplied to the biasing wires (the biasing assembly W) respectively from an external power source via the conductive wires, and the lengths of the biasing wires can be changed so that the movable portion 30 can move relative to the bottom plate 10. In this way, due to the conductive wires formed on bottom plate 10 by insert molding or 3D molded interconnect device technology, the number of components of the lens driving mechanism 1 can be reduced and the dimensions thereof can be greatly decreased.

When applying appropriate driving signals to the biasing assembly W, the biasing assembly W deforms (e.g., by being shortened or elongated) so that the movable portion 30 (and the optical lens disposed therein) is moved relative to the bottom plate 10, to achieve optical image stabilization.

There are several types of motion of the movable portion 30 relative to the bottom plate 10: the movable portion 30 may linearly move relative to the bottom plate 10 in a direction that is substantially perpendicular to the central axis Q; alternatively, the movable portion 30 may rotate around the central axis Q. Thus, the positional and angular compensation for the movable portion 30 can be accomplished by controlling the deformation of the biasing assembly W which receives the appropriate drive signals. In addition, since the movable portion 30 and the bottom plate 10 are also connected through the elastic member S, when the drive signals have not yet been applied to the biasing assembly W, the movable portion 30 can be positioned at an initial position with respect to the bottom plate 10 by the elastic member S.

In some embodiments, the optical driving mechanism 1 may further comprise an alignment assembly (or sensing assembly; not shown) having a first alignment element and a second alignment disposed on the bottom plate 10 and on the movable portion 30 (such as on the bottom surface 34B of the frame 34 thereof), respectively, which are matching each other. The first alignment element may be a permanent magnet or a Hall effect sensor, with the second alignment element being the other of the two. It is possible for the Hall effect sensor to detect the position of the permanent magnet by detecting the change of the magnetic field of the permanent magnet, so as to detect the positional deviation (displacement) of the movable portion 30 relative to the bottom plate 10 due to vibration. In some embodiments, other types of sensing elements/components, such as a magnetoresistive sensor (MRS) or an optical sensor, may also be used to detect the relative position between the movable portion 30 and the bottom plate 10.

Referring to the movement of the movable portion 30 with respect to the bottom plate, for example, as shown in FIG. 5, when appropriate drive signals are applied to the two biasing wires which are opposite each other in FIG. 5, thereby elongating and contracting them, respectively (the elongated biasing wire elongates toward the connecting portion 11; the contracted biasing wire contracts toward the fixed portion 11), the biasing assembly W forces the movable portion 30 (which is connected to the elastic member S) to linearly move in a direction that is perpendicular to the central axis Q with respect to the bottom plate 10. Similarly, when applying appropriate drive signals to these two biasing wires, causing both them to contract, the biasing assembly W forces the movable portion 30 to rotate around the central axis Q relative to the bottom plate 10.

Alternatively, in some embodiments, the biasing assembly W may include one biasing wire disposed on a side of the bottom plate 10, and a guiding mechanism is correspondingly provided for guiding the movable portion 30, to force the movable portion 30 to move linearly or rotate relative to the bottom plate 10.

Next, the movement of the holder 32 of the movable portion 30 (relative to the housing 20/frame 34) driven by the electromagnetic driving assembly ED is described in detail below.

Figure 8:
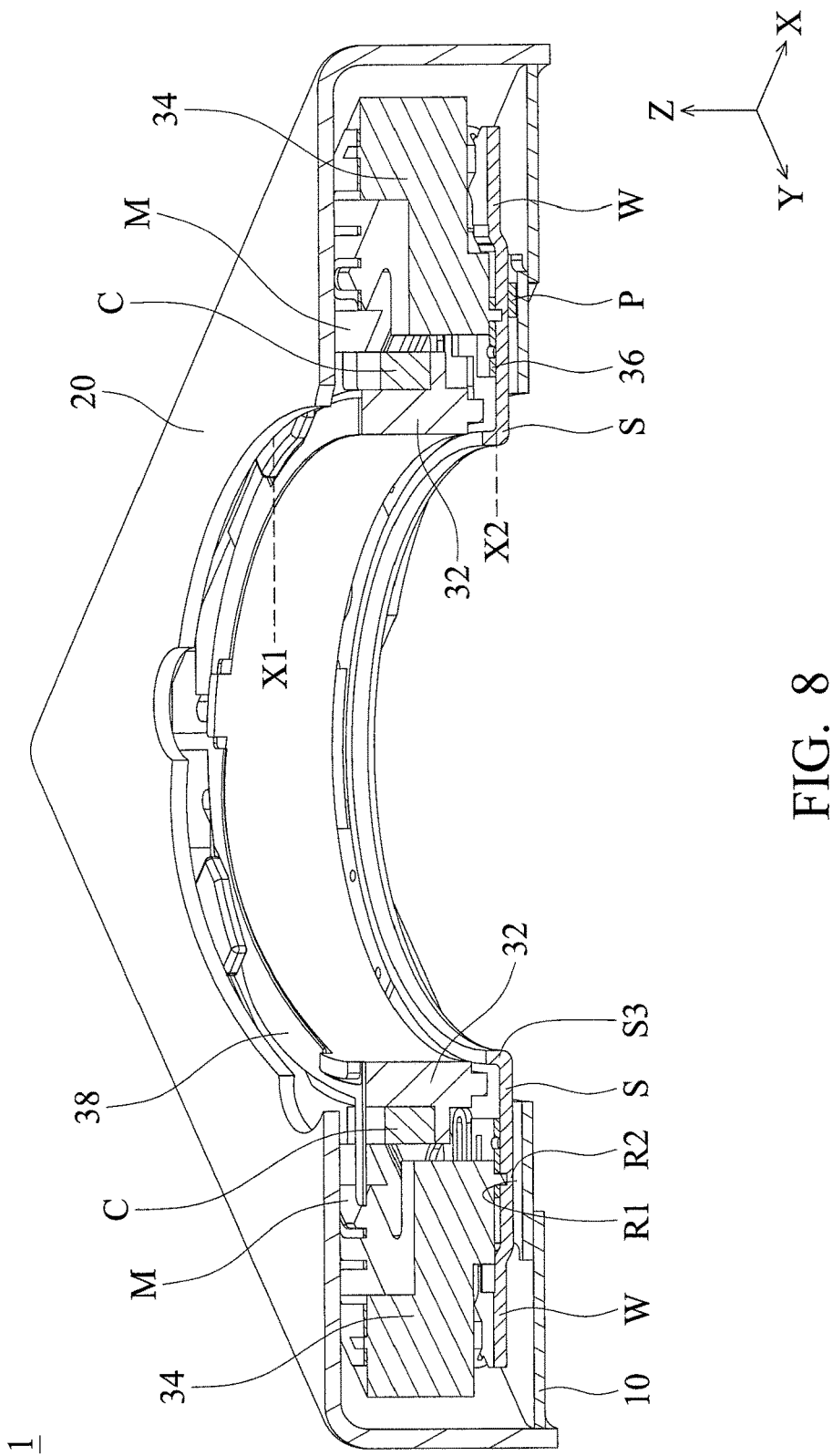
FIGS. 8-9 are sectional view diagrams of the lens driving mechanism in FIG. 1 after assembly taken along line A-A (these two diagrams are different views).
Figure 9:
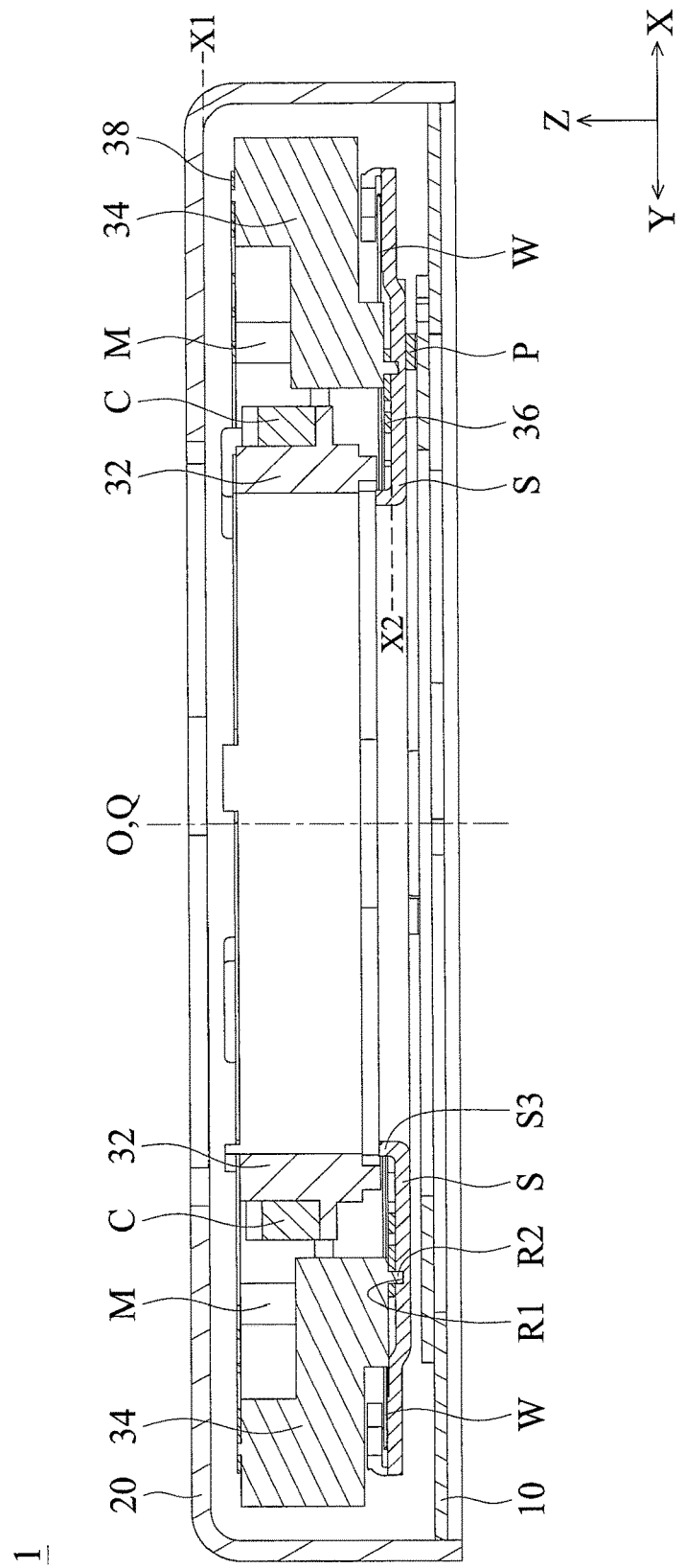

Please refer to FIGS. 8 and 9, when the electromagnetic driving assembly ED forces the holder 32 (the optical lens disposed therein) to move upward relative to the housing 20 and the frame 34 along the optical axis O, the holder 32 can protrude from (be higher than) the frame 34, and the holder 32 is restricted/limited by the housing 20 at an upper-limit position (or upper-extreme position) X1 (the holder 32 is restricted when it moves upward to touch/contact the housing 20).

Similarly, when the electromagnetic driving assembly ED forces the holder 32 (the optical lens disposed therein) to move downward relative to the housing 20 and the frame 34, the holder 32 protrudes from the bottom surface 34B of the frame 34, and the holder 32 is restricted by the elastic member S at an lower-limit position (or lower-extreme position) X2 (the holder 32 is restricted when it moves downward to touch/contact the elastic member S). Therefore, compared to a transitional position-limiting mechanism which the holder is limited by the frame or an additional limiting element, in the present embodiment, instead of the frame 34 servicing as a stopping mechanism (the holder 32 does not touch or contact the frame 34), the housing 20 and the elastic member S are configured to limit the holder 32. Therefore, the distance of movement of the holder 32 in the housing 20 (along the direction of the optical axis O) is effectively increased so that the auto-focusing and optical image stabilization of the optical drive mechanism 1 are improved, and it is possible to save the additional limiting elements and the thickness of the frame 34 in the direction of the optical axis O (due to no longer serving the stopping mechanism), thereby achieving the purpose of miniaturization.

Furthermore, as shown in FIGS. 8 and 9, a plurality of (such as two) first engaging portions R1 are formed on the bottom surface 34B of the frame 34, and the elastic member S has a plurality of (such as two) second engaging portions R2, wherein the first and second engaging portions R1 and R2 match each other. Thus, when the frame 34 is attached to the elastic member S, the first and second engaging portions R1 and R2 serve as a positioning mechanism which can improve the assembly accuracy, and the contact area between them is increased to enhance the connection strength. Moreover, the first and second engaging portions R1 and R2 may be provided with a groove configured to receive a glue for adhesion, so that the glue does not easily flow out to the other components. In the present embodiment, the first engaging portion R1 is a protruding structure, and the second engaging portion R2 is a recessed structure; in another embodiment, the first and second engaging portions R1 and R2 are recessed and protruding structures, respectively.

In summary, a lens driving mechanism is provided, configured to force an optical lens to move. The lens driving mechanism includes a bottom plate, a housing, a movable portion (the optical lens disposed therein), a biasing assembly, and an elastic member. The housing is connected to and disposed on the bottom plate. The movable portion is disposed in the housing and movably connects to the bottom plate via the biasing assembly and the elastic member, wherein the biasing assembly is configured to force the movable portion to move relative to the bottom plate. The movable portion has a frame, a holder, and a first leaf spring. The holder is configured to hold the optical lens and movably connects to the frame. The first leaf spring is disposed under the frame and is connected to a bottom surface of the frame which faces the bottom plate. When the holder moves to an upper-limit position relative to the housing/bottom plate, the holder is in contact with the housing; when the holder moves to a lower-limit position relative to the housing/bottom plate, the holder is in contact with the elastic member. Therefore, by the holder being in direct contact with and restricted via and the elastic member and the housing, the overall size of the lens driving mechanism can be reduced due to additional restriction/stopping mechanisms for the holder being saved and the holder is not overlapping with the frame in the direction the optical axis, and the optical driving mechanism has a better focus function and optical shaking compensation due to a larger space being provided for the holder to move, thereby enhancing the image quality.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered as exemplary only, with a true scope of the disclosed embodiments being indicated by the following claims and their equivalents.

What is claimed is:

1. A lens driving mechanism, configured to drive an optical lens, comprising:
   a bottom plate;
   a housing, connected to and disposed on the bottom plate;
   a movable portion, disposed in the housing; and
   a biasing assembly, connecting the bottom plate and the movable portion and configured to force the movable portion to move relative to the bottom plate;
   wherein the movable portion includes:
   a frame;
   a holder, configured to sustain the optical lens and movably connected to the frame; and
   a first leaf spring, connecting the frame and the holder, and the first leaf spring is disposed on a bottom surface of the frame, wherein the bottom surface faces the bottom plate,
   wherein the biasing assembly includes a shape-memory alloy (SMA) material.

2. The lens driving mechanism as claimed in claim 1, further comprising an elastic member connecting the bottom plate and the first leaf spring of the movable portion, and the first leaf spring is situated between the frame and the elastic member.

3. The lens driving mechanism as claimed in claim 2, wherein the movable portion further includes an electromagnetic driving assembly configured to force the holder to move relative to the frame, and the electromagnetic driving assembly has a coil and a magnetic element respectively disposed on the holder and the frame, wherein the coil, the first leaf spring, and the elastic member are electrically connected to each other, and the first leaf spring is in direct contact with the elastic member.

4. The lens driving mechanism as claimed in claim 2, wherein when the holder moves to a lower-limit position relative to the housing, the holder is in contact with the elastic member.

5. The lens driving mechanism as claimed in claim 4, wherein when the holder moves to the lower-limit position, the holder protrudes from the bottom surface of the frame.

6. The lens driving mechanism as claimed in claim 2, wherein in a direction of an optical axis of the optical lens, the frame, the first leaf spring, and the elastic member are overlapping.

7. The lens driving mechanism as claimed in claim 2, wherein the first leaf spring connects the elastic member, the holder, and the frame, and viewed from a direction of an optical axis of the optical lens, the first leaf spring has a V-shaped structure.

8. The lens driving mechanism as claimed in claim 2, wherein the frame has a first engaging portion, the elastic member has a second engaging portion, and the first and second engaging portions engage with each other.

9. The lens driving mechanism as claimed in claim 2, wherein the elastic member has an opening with a flange structure extending toward the holder.

10. The lens driving mechanism as claimed in claim 9, wherein in a direction perpendicular to an optical axis of the optical lens, the flange structure of the elastic member and the holder are overlapping.

11. The lens driving mechanism as claimed in claim 2, further comprising a plurality of protruding members disposed between the bottom plate and the elastic member, and a gap is Ruined between the bottom plate and the elastic member.

12. The lens driving mechanism as claimed in claim 1, wherein when the holder moves to an upper-limit position relative to the housing, the holder is in contact with the housing.

13. The lens driving mechanism as claimed in claim 1, wherein in a direction of an optical axis of the optical lens, the frame is not overlapping with the holder.

14. The lens driving mechanism as claimed in claim 1, wherein the movable portion further includes a second leaf spring disposed on a top surface of the frame and connecting the frame and the holder.

15. The lens driving mechanism as claimed in claim 14, wherein in a direction which is perpendicular to an optical axis of the optical lens, the second leaf spring and the first leaf spring respectively have a second width and a first width, wherein the second width is larger than the first width.

16. The lens driving mechanism as claimed in claim 14, wherein the movable portion further includes an electromagnetic driving assembly configured to force the holder to move relative to the frame, and the electromagnetic driving assembly has a coil and a magnetic element respectively disposed on the holder and the frame, wherein the second leaf spring has an outer string portion covering the frame and at least a portion of the magnetic element.

17. The lens driving mechanism as claimed in claim 1, wherein the frame includes a permeable material.

18. The lens driving mechanism as claimed in claim 1, wherein the biasing assembly forces the movable portion to move along an optical axis of the optical lens or forces the movable portion to rotate around the optical axis.

19. The lens driving mechanism as claimed in claim 1, wherein the frame includes a board member and a plurality of sub-frames which are separated from each other, wherein the board member has a hollow structure and includes a permeable material, each sub-frame has a groove, and the board member is disposed in the grooves of the sub-frames.

20. A lens driving mechanism, configured to drive an optical lens, comprising:
- a bottom plate;
- a housing, connected to and disposed on the bottom plate;
- a movable portion, disposed in the housing; and
- a biasing assembly, connecting the bottom plate and the movable portion and configured to force the movable portion to move relative to the bottom plate;
- wherein the movable portion includes:
- a frame;
- a holder, configured to sustain the optical lens and movably connected to the frame; and
- a first leaf spring, connecting the frame and the holder, and the first leaf spring is disposed on a bottom surface of the frame, wherein the bottom surface faces the bottom plate,
- wherein the lens driving mechanism further comprises an elastic member connecting the bottom plate and the first leaf spring of the movable portion, and the first leaf spring is situated between the frame and the elastic member.

21. A lens driving mechanism, configured to drive an optical lens, comprising:
- a bottom plate;
- a housing, connected to and disposed on the bottom plate;
- a movable portion, disposed in the housing; and
- a biasing assembly, connecting the bottom plate and the movable portion and configured to force the movable portion to move relative to the bottom plate;
- wherein the movable portion includes:
- a frame;
- a holder, configured to sustain the optical lens and movably connected to the frame; and
- a first leaf spring, connecting the frame and the holder, and the first leaf spring is disposed on a bottom surface of the frame, wherein the bottom surface faces the bottom plate,
- wherein the biasing assembly forces the movable portion to move along an optical axis of the optical lens or forces the movable portion to rotate around the optical axis of the optical lens.

* * * * *